(12) United States Patent
Wakelam

(10) Patent No.: US 11,884,832 B2
(45) Date of Patent: Jan. 30, 2024

(54) MATERIAL RESTORATION COMPOSITION AND METHOD

(71) Applicant: Jeffrey Mark Wakelam, Nampa, ID (US)

(72) Inventor: Jeffrey Mark Wakelam, Nampa, ID (US)

( * ) Notice: Subject to any disclaimer, the term of this patent is extended or adjusted under 35 U.S.C. 154(b) by 0 days.

(21) Appl. No.: 18/121,765

(22) Filed: Mar. 15, 2023

(65) Prior Publication Data

US 2023/0295454 A1 Sep. 21, 2023

Related U.S. Application Data

(60) Provisional application No. 63/320,893, filed on Mar. 17, 2022.

(51) Int. Cl.

| | | |
|---|---|---|
| C09D 123/08 | (2006.01) | |
| C09D 7/20 | (2018.01) | |
| C09D 183/04 | (2006.01) | |
| C11D 1/83 | (2006.01) | |
| C11D 3/04 | (2006.01) | |
| C11D 3/20 | (2006.01) | |
| C11D 3/43 | (2006.01) | |
| C11D 3/50 | (2006.01) | |
| C11D 3/40 | (2006.01) | |
| C11D 11/00 | (2006.01) | |

(Continued)

(52) U.S. Cl.
CPC ...... *C09D 123/0853* (2013.01); *C04B 41/009* (2013.01); *C04B 41/4539* (2013.01); *C04B 41/4869* (2013.01); *C04B 41/4961* (2013.01); *C04B 41/63* (2013.01); *C09D 5/022* (2013.01); *C09D 7/20* (2018.01); *C09D 183/04* (2013.01); *C11D 1/83* (2013.01); *C11D 3/046* (2013.01); *C11D 3/2003* (2013.01); *C11D 3/40* (2013.01); *C11D 3/43* (2013.01); *C11D 3/50* (2013.01); *C11D 11/0052* (2013.01); *C08L 2205/035* (2013.01); *C11D 1/146* (2013.01); *C11D 1/22* (2013.01); *C11D 1/72* (2013.01); *C11D 1/75* (2013.01)

(58) Field of Classification Search
None
See application file for complete search history.

(56) References Cited

U.S. PATENT DOCUMENTS 7,375,069 B2   5/2008   Muradov
8,048,517 B2   11/2011  Kimball
(Continued)

*Primary Examiner* — Eric W Golightly
(74) *Attorney, Agent, or Firm* — Michael C. Balaguy

(57) ABSTRACT

A method of restoring a material surface utilizes a first composition (referred to herein as Composition A) and a second composition (referred to herein as Composition B). Methodologies guide application of Composition A and optionally Composition B to enact various restoration advantages to existing or new material surfaces. Composition A may be first applied to a material surface to remove surface contaminants and lift stains. During the described methodology, a user must wait a predetermined amount of time for Composition A to permeate the material surface. Optionally, Composition B may be subsequently applied to bond voids and damages areas of the material surface, or to add a new surface altogether above the original surface. A user may wait a predetermined amount of time for Composition B to cure.

10 Claims, 7 Drawing Sheets

(51) Int. Cl.
*C04B 41/00* (2006.01)
*C04B 41/45* (2006.01)
*C04B 41/48* (2006.01)
*C04B 41/49* (2006.01)
*C04B 41/63* (2006.01)
*C09D 5/02* (2006.01)
*C11D 1/22* (2006.01)
*C11D 1/14* (2006.01)
*C11D 1/75* (2006.01)
*C11D 1/72* (2006.01)

(56) References Cited

U.S. PATENT DOCUMENTS

| | | |
|---|---|---|
| 2007/0277849 A1 | 12/2007 | Shah |
| 2010/0035786 A1 | 2/2010 | Westwood |
| 2016/0376263 A1* | 12/2016 | Patron ............... C07D 413/14 514/784 |
| 2017/0087199 A1* | 3/2017 | Patron ................ A61K 36/67 |

* cited by examiner

MATERIAL RESTORATION COMPOSITION AND METHOD

CROSS-REFERENCE TO RELATED APPLICATION(S)

The present application is related to and claims priority to U.S. Provisional Patent Application No. 63/320,893 filed Mar. 17, 2022, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of masonry of existing art and more specifically relates to a material restoration product and system.

RELATED ART

Concrete is a composite material of a binding cement and particle aggregate which is easily shaped and cures over time. As the most-used construction material in the world, concrete is highly desirable for its compressive strength, low cost, ease of manufacture, and resilience. However, concrete is not immune to various forms of degradation due to time and abuse, including staining, chipping, cracking, and general destruction. As a porous material, even concrete which is well cared for is subject to serious staining and mineral discoloration.

Because concrete is used as a foundation material in building construction and in decorative architecture, it usually cannot be cheaply or easily replaced. Due to its strength and durability, it cannot be easily re-faced and otherwise reconditioned either. When chipped, cracked, or broken, attempts to fill voids with new cement usually results in insufficient bonding and repairs which do not last. Attempts to solve either problem of reconditioning stains or repairing broken concrete in the prior art has failed to provide solutions which are cost-effective, easily performed, durable over time, and ascetically pleasing. Accordingly, a superior solution is desired.

U.S. Pat. No. 7,375,069 to Nazim Z. Muradov relates to a method for masking and removing stains from rugged solid surface. The described method for masking and removing stains from rugged solid surface includes methods, compositions and kits for masking and subsequent removal of oil, grease, rust and other stains from a variety of rough solid surfaces, including, but not limited to stone, concrete, asphalt, stucco brick, and ceramic. The methods include coating the stains with an opaque or translucent thin film of a composition that makes the stain practically indistinguishable against the background, exposing the coated stain to the elements, such as, sunlight, air, moisture, resulting in spontaneous transformation, degradation and subsequent removal of the stains from the solid surfaces. The compositions include a photocatalyst by itself or the photocatalyst combined with at least one of, a sensitizer, a dopant, a mediator, a co-reagent, a pigment and a binder. The role of a photocatalyst is to produce highly reactive species or radicals and initiate the degradation of a stain upon exposure to elements, such as, sunlight, air and ambient humidity. Artificial light sources can be used instead of sunlight.

Muradov's patent is representative of the prior art solutions. Notably, Muradov merely seeks to mask and obscure visible stains. Muradov also provides no integrated solution for addressing concrete breaks. A superior solution is yet desired.

SUMMARY OF THE INVENTION

In view of the foregoing disadvantages inherent in the known material restoration art, the present disclosure provides a novel material restoration composition and method. The general purpose of the present disclosure, which will be described subsequently in greater detail, is to provide a material restoration composition and method.

A material restoration system disclosed herein. The material restoration system includes a first composition (referred to herein as Composition A) and a second composition (referred to herein as Composition B). Composition A is a cleaning, stain-lifting, and rejuvenation product which is permeable into many construction materials (i.e. concrete). Composition A is capable of removing surface contaminants, including salt, surface rust, calcification and hard water byproducts, oxidation, and efflorescence. Additional applications for Composition A (possibly independently of use with Composition B) may be in removing car wax, adhesives, paint, and headlight hazes. Composition A is a low viscosity liquid and does not form a coating over construction materials; it is permeable into concrete and penetrates the material. Once in the material, Composition A acts to lift stains. Because Composition A permeates surfaces, it may be combined with a coloring agent (i.e. paints or stains) in a mixture of 80% Composition A to 20% coloring agent in order to permanently color construction materials (especially concrete, brick, and stone).

Composition B is a surface applicant and can be used to resurface construction materials (particularly concrete) or fill voids and damage broken construction materials. Composition B is not a liquid and is similar in consistency to concrete; however, it may be diluted with water for make a spreadable refinishing product. Composition B has strong bonding properties and is able to provide structural benefits when used to fill cracks and chips. Further, Composition B may be combined with aggregates to create visual effects when resurfacing.

Material restoration methodologies utilizing Composition A and Composition B is also disclosed herein.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a material restoration composition and method, constructed and operative according to the teachings of the present disclosure.

The various embodiments of the present invention will hereinafter be described in conjunction with the appended drawings, wherein like designations denote like elements.

DETAILED DESCRIPTION

Figure 1:
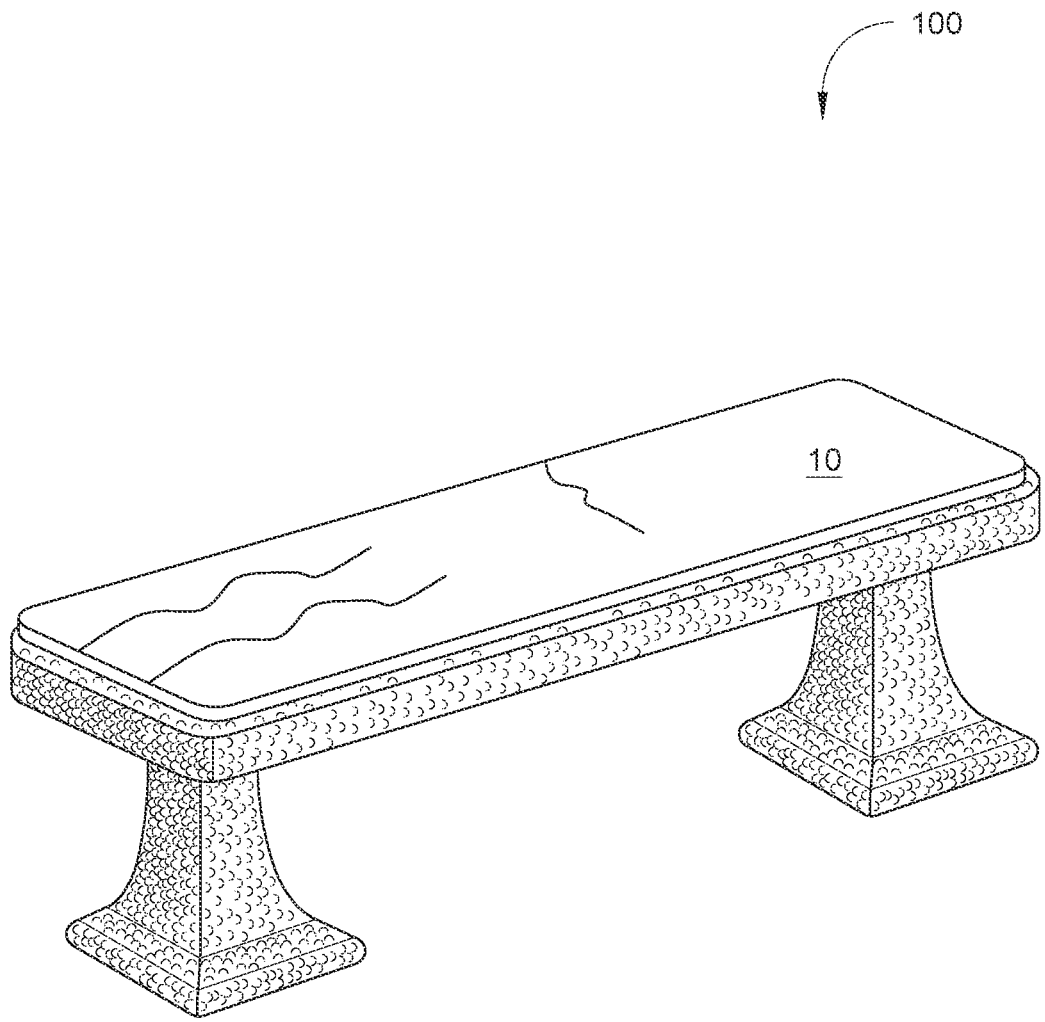
FIG. 1 is a perspective view of a concrete substrate exhibiting cracks and discoloration prior to application of the material restoration system, according to an embodiment of the disclosure.

As discussed above, embodiments of the present disclosure relate to a material restoration product and system and more particularly to a material restoration composition and method as used to repair and restore material surfaces such as concrete.

Generally, the material restoration system includes up to three compositions which perform particular restorative functions for concrete, stone, and other resilient construction materials. While concrete is a primary intended application, a wide variety of materials (including steel, copper, composites, and painted materials) may be treated using one or more of the compositions.

Additionally, disclosed are methodologies for utilizing these restorative compositions in particular orders and application parameters. Some situations do not require the application of all three compositions or use all possible applications of each composition. For example, in some situations only surface restoration, curing calcification, oxidation, and other surface maladies, is needed. In other cases, cracks, chips, and severe structural damage may be present, necessitating additional treatment described in the disclosed methodologies.

In short, the material restoration system disclosed provides masons, artisans, hobbyists, and construction workers with an effective and easy-to-use restoration system which can correct many material maladies. Characteristics of the system are efficient labor requirements, resilience of the final product, ease of applicability in greatly varied temperatures and conditions, and flexibility in use with many structures and materials.

Composition A (alternatively, the "first composition" or the "treating composition") is useful for eliminating salt, surface rust, calcification and hard water, sprinkler stains, oxidation, efflorescence, oversprayed enamel paint, car wax, adhesives, and hazes. Composition A may be applied to a surface with a cloth by hand, with brushes, rollers, or sprayers. Composition A is able to be absorbed into a concrete surface, and does not generally act as a surface coating.

Composition A may be diluted with a coloring agent (such as a paint or stainer) such that a color-mixed variant of Composition A may contain twenty percent of the coloring agent. In such an embodiment, Composition A does not color concrete as a paint, by merely coating the concrete surface. Rather, because the paint or stain is diluted and combined with the composition as detailed above, the concrete is able to absorb the color-mixed variant of Composition A, such that the color is absorbed and fully integrated into the concrete. When mixed, the colored mixture should contain no less than sixty percent of Composition A; however, approximately eighty percent has been found to be ideal. Such a 'colored mixture' of Composition A may be applied separately after an initial treatment of pure Composition A in some scenarios.

Composition B (alternatively, the "second composition" or the "resurfacing composition") is useful for bonding to concrete in order to repair cracks, chips, voids, and breaks with minimal surface preparation. Accordingly, it may be used as a filler to repair and replace missing (broken) pieces of concrete. Additionally, it can be applied in thickness over concrete to create a new surface. It may also be used to create a veined sandstone appearance. In such an application, a batch of Composition B may be mixed with a sand aggregate. The application surface may then be prepared and/or layered with pure Composition B. Then, the Composition B mixture with the sand aggregate may be applied in "veins" as desired by a user. In other applications, various aggregates may be added to Composition B for various visual effects. Composition B chemically bonds to the substrate. Accordingly, it can be applied in multiple, subsequent, thin layers to form a strong and cohesive structure. Various aggregates may be added into Composition B as desired for textures and ornamental purposes.

Since composition B is a bonding material, it may used in more creative structural applications. For example, a concrete driveway which is cracked, discolored, and otherwise damaged may be treated with a thin surface application (for example, 1-inch thick) of Composition B, and pavers or tiles may be placed upon Composition B as a mason would place tiles onto a mortar bed. The strength of Composition B is such that even such a thin layer will support a vehicle driving over the pavers without cracking. Such a refurbishment is far less expensive than demolishing the concrete driveway and replacing it with a from-scratch paver installation, as well as less labor intensive. This kind of refurbishment cannot be accomplished with any other masonry materials currently known in the art.

It should be noted that while the disclosed compositions are seen as particularly advantageous for refinishing concrete, they may be used with other materials as well. In particular, Composition A has been found useful in refinishing brick & mortar, concrete, chrome, fiberglass, glass, plastic, plexiglass, metal, stainless steel, stone, and vinyl. Composition B may be applied with a brush, roller, or sprayer. When spraying, Composition B may optionally be diluted by water.

Additionally, Composition C (alternatively, the "third composition" or the "sealing composition") may be used as a top coating for material surfaces, to be used in conjunction with (and following) an application of Composition A. Composition C may seal, protect, waterproof, and enhance a surface appearance of the material surface when used correctly with the disclosed methodologies.

In an ideal embodiment, each composition may be composed thusly:

COMPOSITION A: Sixty-two percent alcohol; thirty-three percent cutting oil; and no more than five percent of a detergent composition. The detergent composition itself may include a mixture of approximately equal parts of: denatured alcohol; C9-11 Pareth 8; Sodium C14-16; Sodium laureth sulfate; Sodium chloride; Daceth 8; Amine oxide; Sodium xylernsulfatel; fragrance; and color. Note that in varying embodiments each proportion of an ingredient may diverge up to fifteen percent of the percentage specified here. However, the values given herein are found to be an ideal embodiment.

COMPOSITION B: fifteen percent synthetic rubber emulsion; twenty percent latex bonding agent; twenty percent polymeric resin; thirty percent type II ethylene polyvinyl acetate; four percent co-polymer; one percent sodium; and ten percent water. In use, Composition B may be further diluted with water as necessary. Again, note that in varying embodiments each proportion of an ingredient may diverge up to fifteen percent of the percentage specified here. However, the values given herein are found to be an ideal embodiment.

COMPOSITION C: five-percent water; five percent alcohol; and ninety-percent of the combination of: water-based silicone release agent, a silicone release agent, (such as RELEASE release agent as manufactured by TechniChem) and ten percent dilute. The dilute may be a mixture of water and alcohol, such as half water and half alcohol, or pure water. Again, note that in varying embodiments each proportion of an ingredient may diverge up to fifteen percent of the percentage specified here. However, the values given herein are found to be an ideal embodiment.

Figure 2:
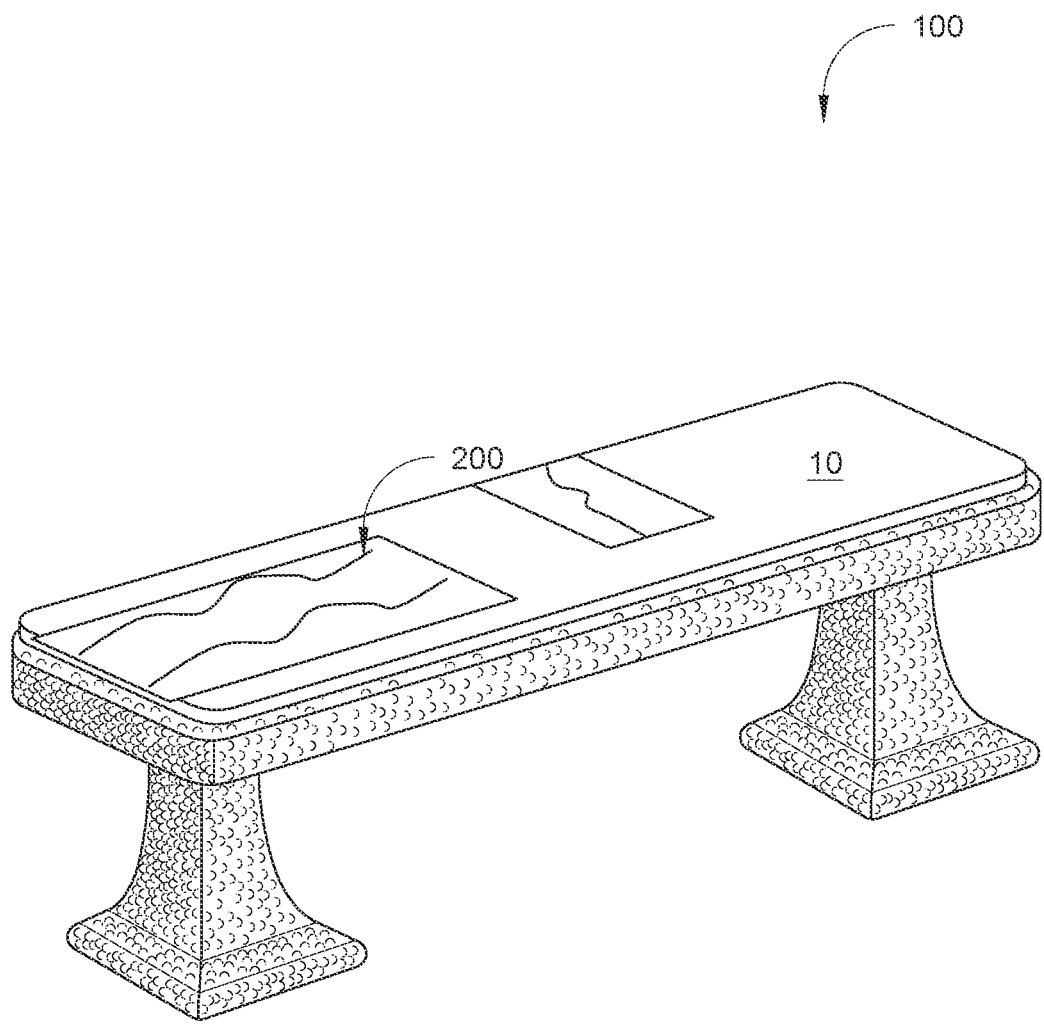
FIG. 2 is a perspective view of the concrete substrate of FIG. 1 after application of Composition A, according to an embodiment of the present disclosure.
Figure 3:
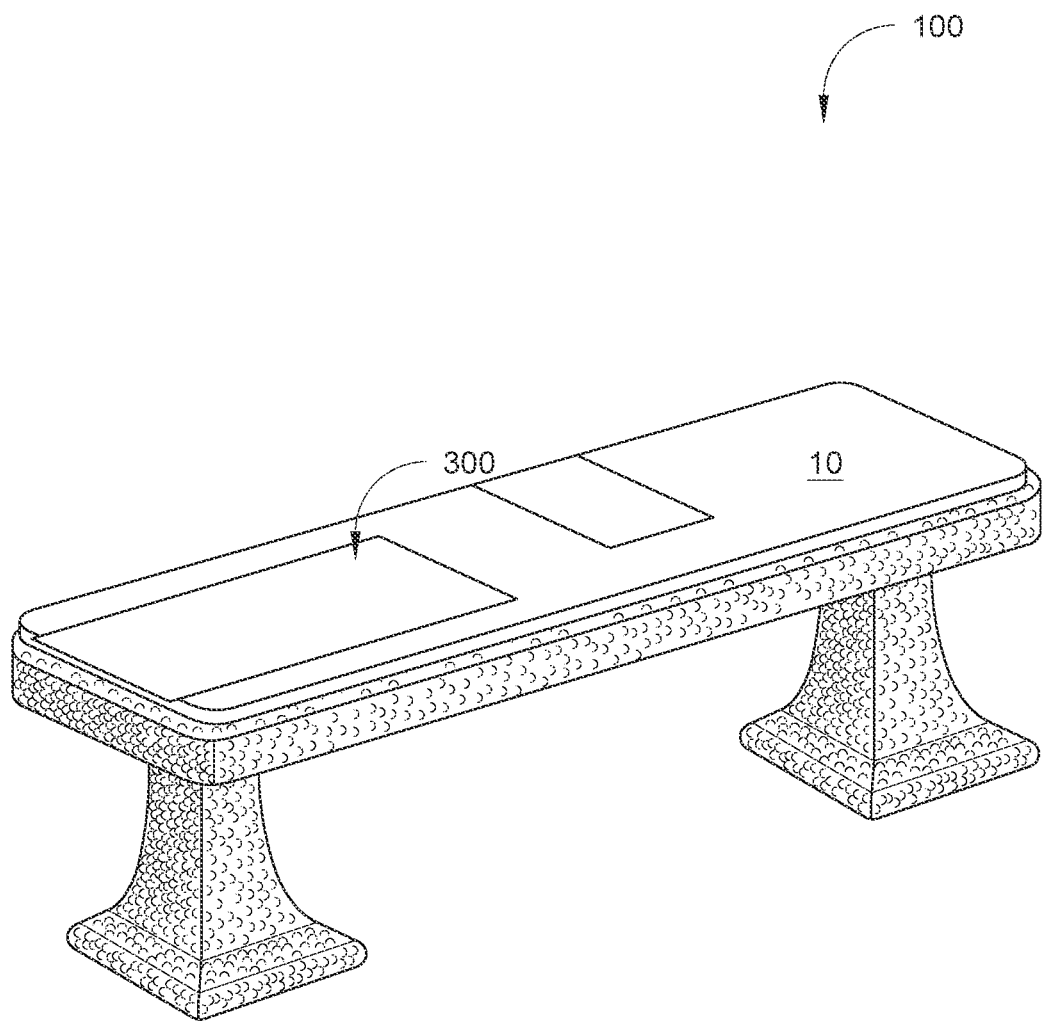
FIG. 3 is a perspective view of the concrete substrate of FIG. 1 after application of Composition B, according to an embodiment of the present disclosure.

Referring now more specifically to the drawings by numerals of reference, there is shown in FIGS. 1-3, various views of a restoration system 100.

FIGS. 1-3 are perspective views of a concrete substrate exhibiting cracks and discoloration prior to application of the material restoration system, according to an embodiment of the disclosure. Material restoration system 100 may include Composition A 200 and Composition B 300. FIG. 1 illustrates a material surface 10 before treating. FIG. 2 illustrates Composition A 200 being applied to material surface 10 to be absorbed into the substrate. FIG. 3 illustrates Composition B 300 being applied to material surface 10 to fill cracks and form a new surface. Composition C (not illustrated) may be applied to a surface when appropriate in like fashion.

Figure 4:
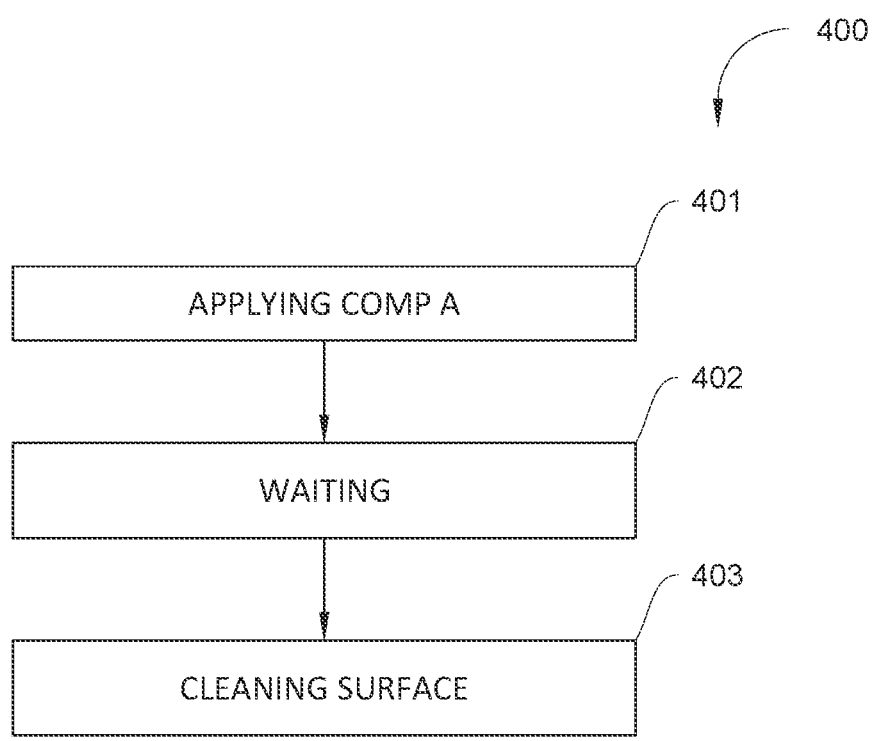
FIG. 4 is a flow diagram illustrating a method for treating a material surface using Composition A, according to an embodiment of the present disclosure.

FIG. 4 is a flow diagram illustrating a first method for applying the material restoration system to a material surface, according to an embodiment of the present disclosure. In particular, this first method for applying the material restoration system to a material surface 400 may include one or more components or features of the restoration system 100 as described above. As illustrated, the method for applying the material restoration system to a material surface 400 may include the steps of: step one 401, applying Composition A to the material surface with a clean cloth, brush, roller, or sprayer; step two 402, waiting at least thirty minutes for Composition A to be absorbed into the material surface; and step three 403, cleaning the material surface with water or soapy water.

Figure 5:
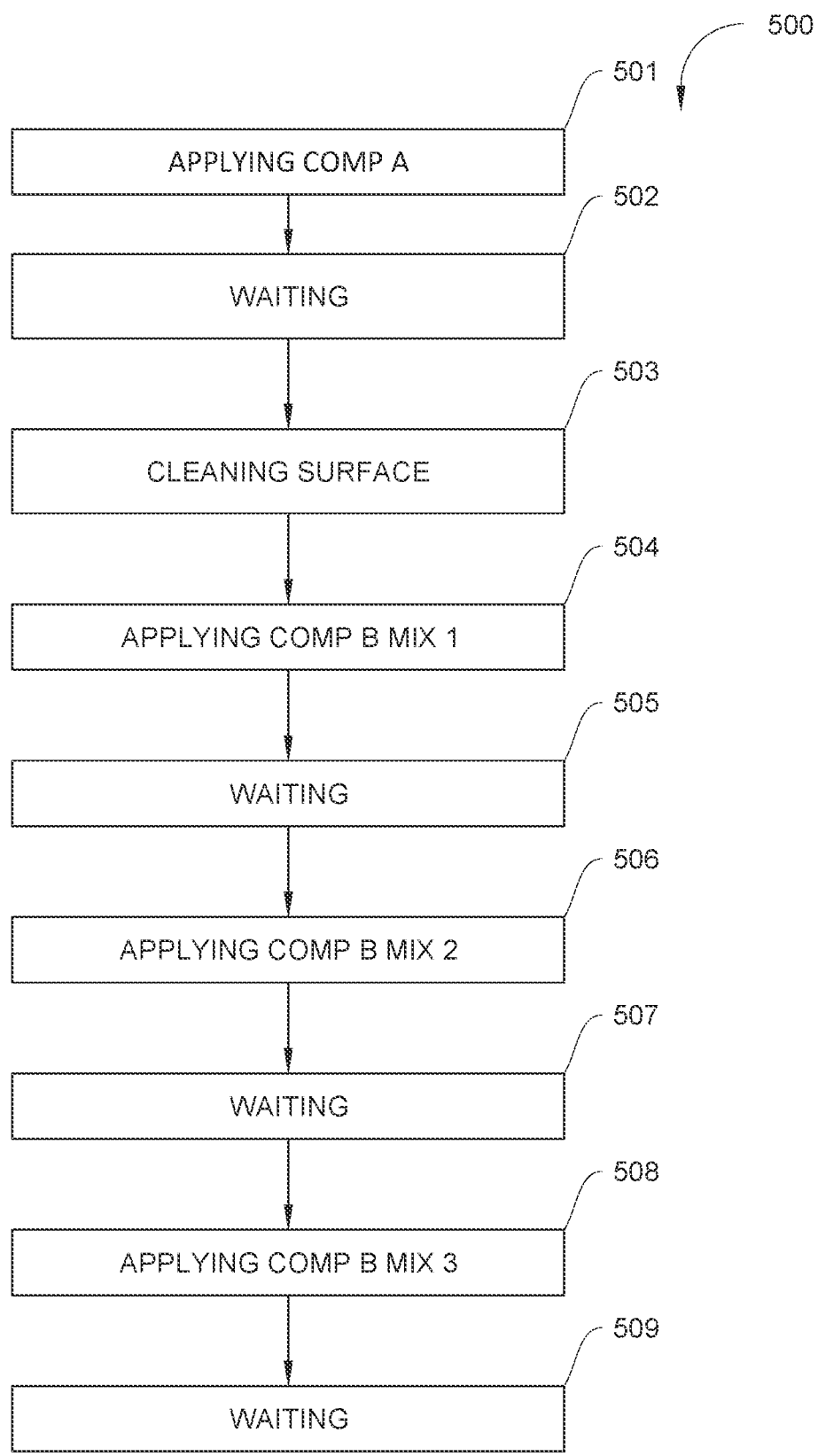
FIG. 5 is a flow diagram illustrating a method for treating a material surface using Composition A and Composition B, according to an embodiment of the present disclosure.

FIG. 5 is a flow diagram illustrating a second method for applying Composition B of the material restoration system to a material surface, according to an embodiment of the present disclosure. In particular, this second method for applying the material restoration system to a material surface 500 may include one or more components or features of the restoration system 100 as described above. As illustrated, the method for applying the material restoration system to a material surface 500 may include the steps of: step one 501, applying Composition A to the material surface with a clean cloth, brush, roller, or sprayer; step two 502, waiting at least thirty minutes for Composition A to be absorbed into the material surface; step three 503, cleaning the material surface with water or soapy water; step four 504, applying a first mixture of composition B and water (preferably ⅓ composition B and ⅔ water) to the material surface; step five 505, waiting at least half an hour for the first mixture to be absorbed by the material surface; step six 506, applying a second mixture of Composition B and water (preferably ½ Composition B and ½ water) to the material surface; step seven 507, waiting at least an hour for the second mixture to be absorbed by the material surface; step eight 508, applying a third mixture of Composition B and a solid aggregate (preferably between 30 and 35 percent Composition B) to the material surface via broadcasting or troweling; and step nine 509, waiting at least twenty-four hours for the third mixture to dry and cure.

Figure 6:
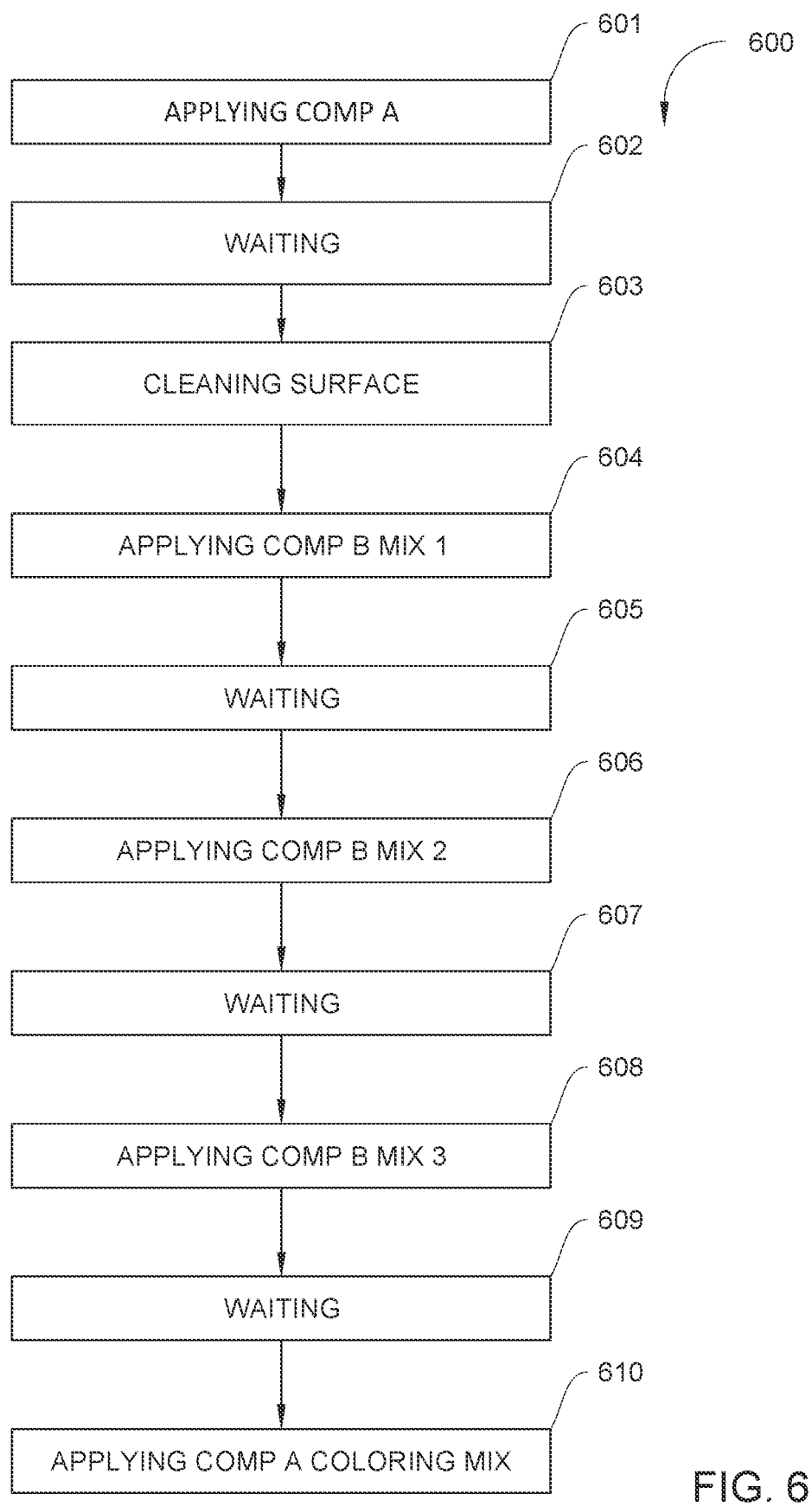
FIG. 6 is a flow diagram illustrating a method for treating a material surface using Composition A, Composition B, and a coloring agent, according to an embodiment of the present disclosure.

FIG. 6 is a flow diagram illustrating a third method for applying Composition B of the material restoration system to a material surface, according to an embodiment of the present disclosure. In particular, this third method for applying the material restoration system to a material surface 600 may include one or more components or features of the restoration system 100 as described above. As illustrated, the method for applying the material restoration system to a material surface 600 may include the steps of: step one 601, applying Composition A to the material surface with a clean cloth, brush, roller, or sprayer; step two 602, waiting at least thirty minutes for Composition A to be absorbed into the material surface; step three 603, cleaning the material surface with water or soapy water; step four 604, applying a first mixture of composition B and water (preferably ⅓ composition B and ⅔ water) to the material surface; step five 605, waiting at least half an hour for the first mixture to be absorbed by the material surface; step six 606, applying a second mixture of Composition B and water (preferably ½ Composition B and ½ water) to the material surface; step seven 607, waiting at least an hour for the second mixture to be absorbed by the material surface; step eight 608, applying a third mixture of Composition B and a solid aggregate (preferably between 30 and 35 percent Composition B) to the material surface via broadcasting or troweling; step nine 609, waiting at least twenty-four hours for the third mixture to dry and cure; and step ten 610, applying of fourth mixture of Composition A and a coloring agent (preferably 80 percent Composition A to 20 percent coloring agent) to the new surface formed by the third mixture.

Figure 7:
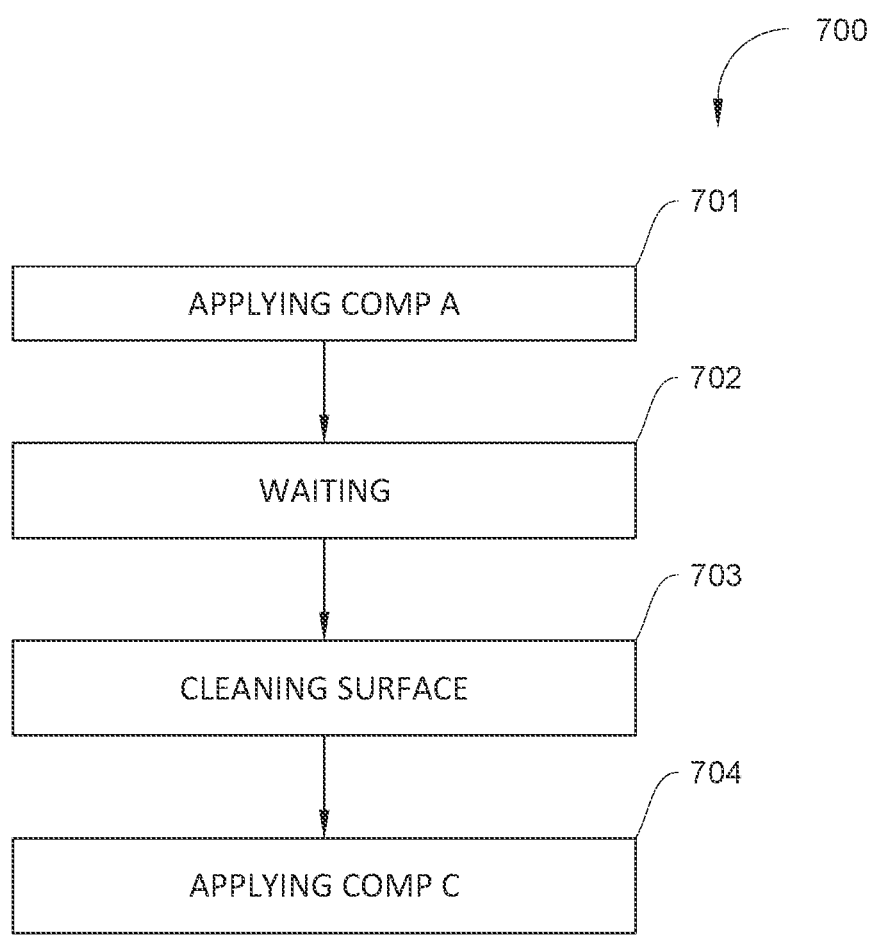
FIG. 7 is a flow diagram illustrating a method for treating a material surface using Composition A and Composition C, according to an embodiment of the present disclosure.

FIG. 7 is a flow diagram illustrating a first method for applying the material restoration system to a material surface with the addition of a surface sealing coat, according to an embodiment of the present disclosure. In particular, this method for applying the material restoration system to a material surface with the addition of a surface sealing coat 700 may include one or more components or features of the restoration system 100 as described above. As illustrated, the method for applying the material restoration system to a material surface with the addition of a surface sealing coat 700 may include the steps of: step one 701, applying Composition A to the material surface with a clean cloth, brush, roller, or sprayer; step two 702, waiting at least thirty minutes for Composition A to be absorbed into the material surface; step three 703, cleaning the material surface with water or soapy water; and step four 704, applying Composition C to the material surface in order to implement a sealer top coating.

It should be noted that some steps may be optional in various embodiments and may not be implemented in all cases. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for restoring material surfaces, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A method of, restoring a material surface, the method comprising the steps of:
    applying a first composition to the material surface, the first composition comprising
        at least fifty percent alcohol by volume,
        at least twenty percent cutting oil by volume,
        denatured alcohol,
        C9-11 Pareth-8,
        Sodium C14-16,
        Sodium laureth sulfate,
        Sodium chloride, and
        Sodium xylenesulfonate;
    waiting until the first composition absorbs into the material surface, requiring a minimum of thirty minutes;
    applying a second composition to the material surface; and
    waiting for the second composition to cure before applying contact to the material surface, requiring a minimum of thirty minutes, the second composition comprising
        synthetic rubber emulsion;
        latex bonding agent;
        polymeric resin;
        ethylene;
        polyvinyl acetate; and
        water.

2. The method of claim 1, further comprising the steps of forming a colored-mixture comprising the first composition and a coloring agent;
    applying the colored-mixture to the material surface; and
    waiting until the colored-mixture absorbs into the material surface, requiring a minimum of thirty minutes.

3. The method of claim 2, whereby the colored-mixture comprises a minimum of sixty percent by volume of the first composition.

4. The method of claim 1, whereby the second composition is applied to the material surface by broadcasting.

5. The method of claim 1, whereby the second composition is applied to the material surface by troweling.

6. The method of claim 1, whereby the first composition is applied to the material surface by a roller.

7. The method of claim 1, whereby the first composition is applied to the material surface by a sprayer.

8. The method of claim 1, whereby the first composition is applied to the material surface by a brush.

9. The method of claim 1, whereby the first composition is applied to the material surface by a cloth.

10. A method of restoring a material surface, the method comprising the steps of:
    applying a first composition to the material surface, the first composition comprising
        at least fifty percent alcohol by volume,
        at least twenty percent cutting oil by volume,
        denatured alcohol,
        C9-11 Pareth-8,
        Sodium C14-16,
        Sodium laureth sulfate,
        Sodium chloride, and
        Sodium xylenesulfonate; and
    waiting until the first composition absorbs into the material surface, requiring a minimum of thirty minutes.

* * * * *